United States Patent
Guo et al.

(10) Patent No.: US 10,813,131 B2
(45) Date of Patent: Oct. 20, 2020

(54) METHOD AND APPARATUS FOR IMPROVING RANDOM ACCESS PREAMBLE TRANSMISSION IN A WIRELESS COMMUNICATION SYSTEM

(71) Applicant: INNOVATIVE SONIC CORPORATION, Taipei (TW)

(72) Inventors: Yu-Hsuan Guo, Taipei (TW); Ko-Chiang Lin, Taipei (TW)

(73) Assignee: Innovative Sonic Corporation, Taipei (TW)

(*) Notice: Subject to any disclaimer, the term of this patent is extended or adjusted under 35 U.S.C. 154(b) by 7 days.

(21) Appl. No.: 14/444,277

(22) Filed: Jul. 28, 2014

(65) Prior Publication Data
US 2015/0036617 A1 Feb. 5, 2015

Related U.S. Application Data

(60) Provisional application No. 61/859,931, filed on Jul. 30, 2013.

(51) Int. Cl.
*H04W 74/08* (2009.01)
*H04W 52/38* (2009.01)
*H04W 52/50* (2009.01)
*H04W 52/36* (2009.01)

(52) U.S. Cl.
CPC ....... *H04W 74/0833* (2013.01); *H04W 52/38* (2013.01); *H04W 52/50* (2013.01); *H04W 52/362* (2013.01)

(58) Field of Classification Search
CPC ... H04W 52/362; H04W 52/38; H04W 52/50; H04W 74/0833
See application file for complete search history.

(56) References Cited

U.S. PATENT DOCUMENTS

| | | | |
|---|---|---|---|
| 9,408,163 B2* | 8/2016 | Han | H04W 52/146 |
| 2004/0110521 A1* | 6/2004 | Soldani | H04L 1/18 455/509 |
| 2007/0115872 A1* | 5/2007 | Kim | H04W 52/44 370/318 |
| 2007/0149235 A1* | 6/2007 | Chin | H04W 52/50 455/522 |
| 2008/0194259 A1* | 8/2008 | Vujcic | H04W 74/0866 455/435.1 |

(Continued)

*Primary Examiner* — Parth Patel
*Assistant Examiner* — Berhanu D Belete
(74) *Attorney, Agent, or Firm* — Blue Capital Law Firm, P.C.

(57) ABSTRACT

Methods and apparatuses are disclosed for improving Random Access preamble transmission in a wireless communication system. The method includes receiving a configuration of an initial power and a power ramping step for a preamble transmission. The method also includes transmitting a first Preamble using a first power based on at least the initial power and the power ramping step, wherein the first Preamble is the last preamble transmission of a first Random Access procedure. The method includes determining whether the first Random Access procedure is successfully completed. The method also includes transmitting a second Preamble using a second power based on at least the first power, wherein the second Preamble is the first preamble transmission of a second Random Access procedure.

16 Claims, 6 Drawing Sheets

(56) References Cited

U.S. PATENT DOCUMENTS

| | | | | |
|---|---|---|---|---|
| 2008/0259861 A1 | * | 10/2008 | Kang | H04W 52/50 370/329 |
| 2009/0252119 A1 | * | 10/2009 | Fischer | H04W 74/004 370/331 |
| 2010/0105405 A1 | * | 4/2010 | Vujcic | H04L 5/0053 455/452.1 |
| 2010/0232318 A1 | * | 9/2010 | Sarkar | H04W 24/02 370/254 |
| 2010/0255847 A1 | * | 10/2010 | Lee | H04W 74/004 455/436 |
| 2010/0290408 A1 | * | 11/2010 | Steudle | H04W 52/50 370/329 |
| 2010/0296467 A1 | * | 11/2010 | Pelletier | H04W 72/042 370/329 |
| 2010/0323736 A1 | * | 12/2010 | Fischer | H04W 74/0866 455/509 |
| 2011/0075636 A1 | * | 3/2011 | Blomgren | H04L 1/1887 370/336 |
| 2011/0159802 A1 | * | 6/2011 | Binti Harum | H04B 7/15528 455/7 |
| 2011/0165874 A1 | * | 7/2011 | Amirijoo | H04W 74/0866 455/434 |
| 2012/0069788 A1 | * | 3/2012 | Shen | H04W 74/006 370/315 |
| 2013/0010641 A1 | * | 1/2013 | Dinan | H04L 5/0007 370/254 |
| 2013/0010711 A1 | * | 1/2013 | Larsson | H04W 56/0045 370/329 |
| 2013/0010716 A1 | * | 1/2013 | Dinan | H04W 76/15 370/329 |
| 2013/0039314 A1 | * | 2/2013 | Prateek | H04W 74/08 370/329 |
| 2013/0044715 A1 | * | 2/2013 | Baker | H04W 52/04 370/329 |
| 2013/0058315 A1 | * | 3/2013 | Feuersanger | H04W 52/346 370/336 |
| 2013/0064226 A1 | * | 3/2013 | Dinan | H04W 36/08 370/332 |
| 2014/0016488 A1 | * | 1/2014 | Xu | H04W 72/005 370/252 |
| 2014/0177500 A1 | * | 6/2014 | Han | H04W 52/36 370/311 |
| 2014/0293918 A1 | * | 10/2014 | Vujcic | H04W 48/12 370/329 |
| 2014/0349712 A1 | * | 11/2014 | Shukla | H04W 52/50 455/561 |
| 2015/0057011 A1 | * | 2/2015 | Di Girolamo | H04W 74/0808 455/454 |
| 2015/0085787 A1 | * | 3/2015 | Ouchi | H04L 5/0037 370/329 |
| 2015/0124673 A1 | * | 5/2015 | Ouchi | H04W 52/362 370/311 |
| 2015/0189675 A1 | * | 7/2015 | Feuersaenger | H04W 52/327 370/329 |
| 2017/0135135 A1 | * | 5/2017 | Pelletier | H04L 1/0072 |

* cited by examiner

METHOD AND APPARATUS FOR IMPROVING RANDOM ACCESS PREAMBLE TRANSMISSION IN A WIRELESS COMMUNICATION SYSTEM

CROSS-REFERENCE TO RELATED APPLICATIONS

The present Application claims the benefit of U.S. Provisional Patent Application Ser. No. 61/859,931 filed on Jul. 30, 2013, the entire disclosure of which is incorporated herein by reference.

FIELD

This disclosure generally relates to wireless communication networks, and more particularly, to methods and apparatuses for improving Random Access preamble transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses are disclosed for improving Random Access preamble transmission in a wireless communication system. The method includes receiving a configuration of an initial power and a power ramping step for a preamble transmission. The method also includes transmitting a first Preamble using a first power based on at least the initial power and the power ramping step, wherein the first Preamble is the last preamble transmission of a first Random Access procedure. The method includes determining the first Random Access procedure is successfully completed. The method also includes transmitting a second Preamble using a second power based on at least the first power, wherein the second Preamble is the first preamble transmission of a second Random Access procedure.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. TR 36.888 V12.0.0, entitled "Study on provision of low-cost Machine-Type Communications (MTC) User Equipments (UEs) based on LTE"; TS 36.331 V11.4.0, entitled "E-UTRA RRC protocol specification"; TS 36.321 V11.3.0, entitled "E-UTRA MAC protocol specification"; and TS 36.213 V11.3.0, entitled "E-UTRA Physical layer procedures". The standards and documents listed above are hereby expressly incorporated by reference in their entirety.

Figure 1:
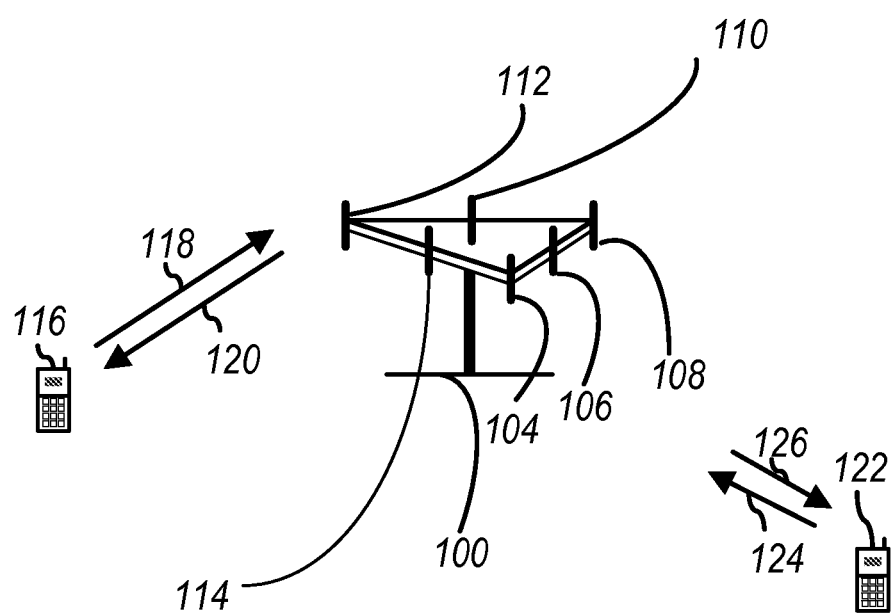
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
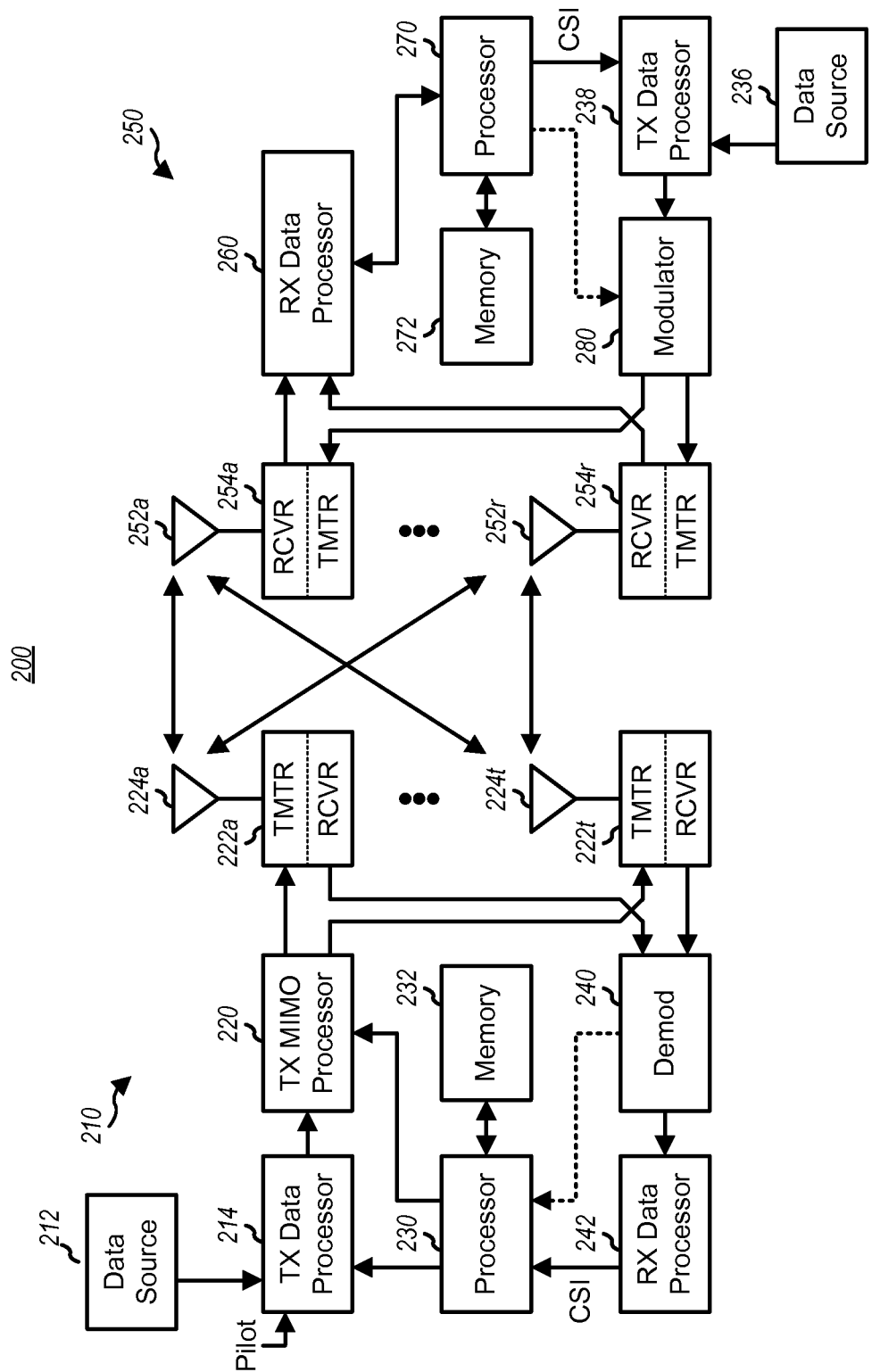
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
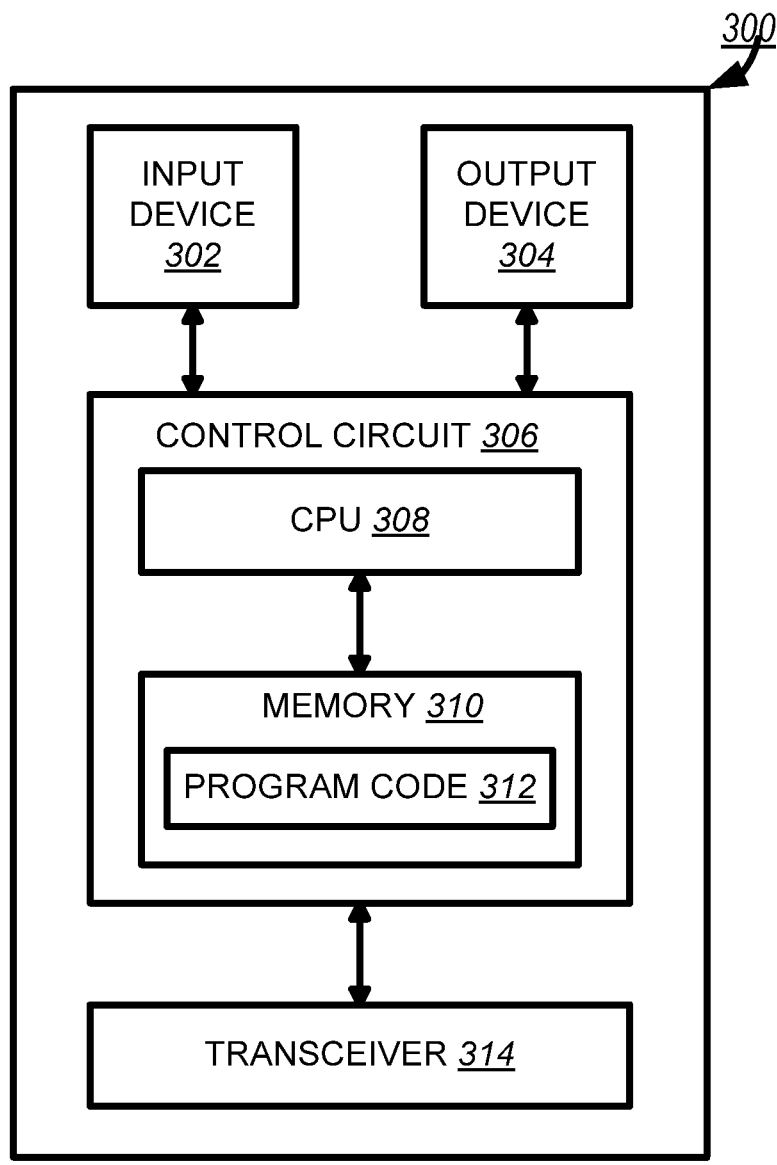
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
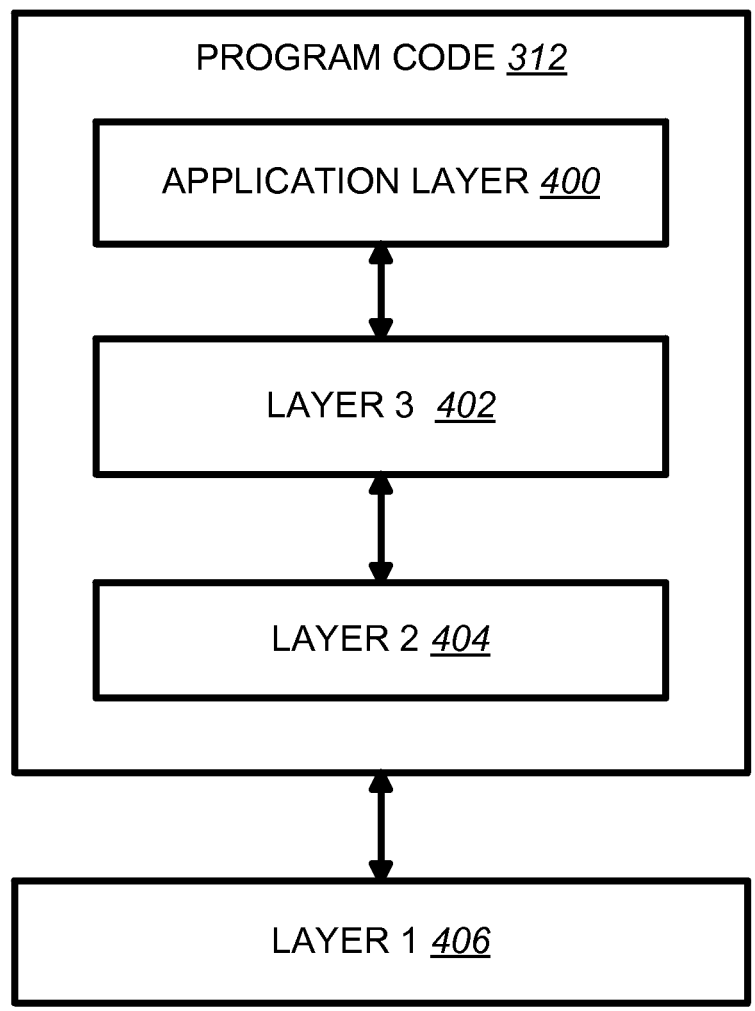
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

The study for low-cost Machine-type Communication (MTC) UEs based on LTE has been captured in 3GPP TR 36.888. Various features and their modifications to reduce cost and improve coverage along with hardware simplifications that will enable production of low-cost MTC UE's. Coverage improvement is also studied primarily for delay tolerant low-cost MTC devices that are not mobile.

MTC is an important revenue stream for operators because it has a huge potential from the operator perspective. It is also more efficient for operators to be able to serve MTC UE using already deployed radio access technology. As LTE deployments evolve, operators would like to reduce the cost of overall network maintenance by minimizing the number of Radio Access Technologies (RATs). Therefore, it is important for operators to understand whether LTE could be a competitive RAT for efficient support of MTC, e.g., low cost for a LTE MTC UE.

The identified characteristics of MTC UEs in 3GPP TR 36.888 include:

It requires low operational power consumption

It is expected to communicate with infrequent small burst transmissions

Minimum data rate: downlink 118.4 Kbps, uplink 59.2 Kbps

It supports limited mobility (i.e. no support of seamless handover; ability to operate in networks in different countries)

In addition, there is a substantial market for the Machine to Machine (M2M) use cases for devices deployed deep inside buildings that would require coverage enhancement as compared to the defined LTE cell coverage footprint. Some MTC UEs are installed in the basements of residential buildings or locations shielded by foil-backed insulation, metalized windows, or traditional thick-walled building construction. These UEs would experience significantly greater penetration losses on the radio interface than normal LTE devices. The MTC UEs in the extreme coverage scenario might have characteristics such as very low data rate, greater delay tolerance, and no mobility, and therefore some messages/channels may not be required. Performance evaluation of coverage improvement techniques shall be analysed in terms of coverage, power consumption, cell spectral efficiency, specification impacts and, cost or complexity analysis.

It is suggested in 3GPP TR 36.888 V12.0.0 that a new MTC-specific UE category should be introduced, and any adopted MTC-related low-cost technique affecting the UE and/or network performance would be restricted to this new UE category only. It makes sure the existing UE categories are not affected by the simplifications intended for low-cost MTC UEs. Also, it allows the network to identify the UEs which use simplifications affecting the UE or network performance, since the UE reports its category upon initial connection. Besides, 3GPP TR 36.888 V12.0.0 also mentions the possibility of the network identifying the UEs by the reception of PRACH.

Currently, 3GPP TS 36.331 V11.4.0 provides parameters for a Random Access procedure by system information, e.g. systemInformationBlockType2, or by a RRCConnectionReconfiguration message. They are disclosed as follows:

RACH-ConfigCommon

The IE RACH-ConfigCommon is used to specify the generic random access parameters.

RACH-ConfigCommon information element

```
-- ASN1START
RACH-ConfigCommon : :=   SEQUENCE {
    preambleInfo                        SEQUENCE {
        numberOfRA-Preambles                ENUMERATED {
                                                n4, n8, n12, n16, n20, n24, n28,
                                                n32, n36, n40, n44, n48, n52, n56,
                                                n60, n641},
        preamblesGroupAConfig               SEQUENCE {
            sizeOfRA-PreamblesGroupA            ENUMERATED {
                                                    n4, n8, n12, n16, n20, n24, n28,
                                                    n32, n36, n40, n44, n48, n52, n56,
                                                    n60},
            messageSizeGroupA                   ENUMERATED {b56, b144, b208, b256},
            messagePowerOffsetGroupB            ENUMERATED {
                                                    minusinfinity, dB0, dB5, dB8, dB10, dB12,
                                                    dB15, dB18},
            ...
        }    OPTIONAL                          -- Need OP
    },
    powerRampingParameters              PowerRampingParameters,
    ra-SupervisionInfo                  SEQUENCE {
        preambleTransMax                    PreambleTransMax,
        ra-ResponseWindowSize               ENUMERATED {
                                                sf2, sf3, sf4, sf5, sf6, sf7,
                                                sf8, sf10},
        mac-ContentionResolutionTimer       ENUMERATED {
                                                sf8, sf16, sf24, sf32, sf40, sf48,
                                                sf56, sf64}
    },
    maxHARQ-Msg3Tx                      INTEGER (1 . . 8),
    ...
}
RACH-ConfigCommonSCell-r11 : : =     SEQUENCE {
    powerRampingParameters-r11              PowerRampingParameters,
    ra-SupervisionInfo-r11                  SEQUENCE {
        preambleTransMax-r11                    PreambleTransMax
    },
    ...
}
PowerRampingParameters : : =         SEQUENCE {
    powerRampingStep                        ENUMERATED {dB0, dB2, dB4, dB6},
    preambleInitialReceivedTargetPower      ENUMERATED {
                                                dBm-120, dBm-118, dBm-116, dBm-114, dBm-112,
                                                dBm-110, dBm-108, dBm-106, dBm-104, dBm-102,
                                                dBm-100, dBm-98, dBm-96, dBm-94,
                                                dBm-92, dBm-90}
}
```

-continued

RACH-ConfigCommon information element

```
preambleTransMax : : =           ENUMERATED {
                                 n3, n4, n5, n6, n7, n8, n10, n20, n50,
                                 n100, n200}
--ASN1STOP
``` powerRampingStep: Power ramping factor. Value in dB. Value dB0 corresponds to 0 dB, dB2 corresponds to 2 dB and so on.

preambleInitialReceivedTargetPower: Initial preamble power. Value in dBm. Value dBm−120 corresponds to −120 dBm, dBm−118 corresponds to −118 dBm and so on.

preambleTransMax: Maximum number of preamble transmission. Value is an integer. Value n3 corresponds to 3, n4 corresponds to 4 and so on.

As disclosed in 3GPP TS 36.321 V11.3.0, the power ramping for Random Access Preamble transmission is controlled by MAC layer:
5.1.3 Random Access Preamble Transmission
The random-access procedure shall be performed as follows:
 set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
 instruct the physical layer to transmit a preamble using the selected PRACH, corresponding RA-RNTI, preamble index and PREAMBLE_RECEIVED_TARGET_POWER.

Based on the quotation above, the power used to transmit the first Preamble in a Random Access procedure is preambleInitialReceivedTargetPower+DELTA_PREAMBLE. And the power used to transmit a following Preamble is increased by powerRampingStep comparing with the power for the last Preamble in the same Random Access procedure. With power ramping, the power for a Preamble is increased step by step until the corresponding Random Access procedure is complete, e.g. eNB receives the Preamble successfully. The details of Random Access procedure can be found in 3GPP TS 36.321 V11.3.0.

As disclosed in 3GPP TS 36.213 V11.3.0, the actual power used to transmit a Preamble, e.g. $P_{PRACH}$, is controlled by physical layer based on maximum power and pathloss:
6.1 Physical Non-Synchronized Random Access Procedure
From the physical layer perspective, the L1 random access procedure encompasses the transmission of random access preamble and random access response. The remaining messages are scheduled for transmission by the higher layer on the shared data channel and are not considered part of the L1 random access procedure. A random access channel occupies 6 resource blocks in a subframe or set of consecutive subframes reserved for random access preamble transmissions. The eNodeB is not prohibited from scheduling data in the resource blocks reserved for random access channel preamble transmission.
The following steps are required for the L1 random access procedure:
1. Layer 1 procedure is triggered upon request of a preamble transmission by higher layers.
2. A preamble index, a target preamble received power (PREAMBLE_RECEIVED_TARGET_POWER), a corresponding RA-RNTI and a PRACH resource are indicated by higher layers as part of the request.
3. A preamble transmission power $P_{PRACH}$ is determined as $P_{PRACH}=\min\{P_{CMAX,c}(i)$, PREAMBLE_RECEIVED_TARGET_POWER+$PL_c\}$_[dBm], where $P_{CMAX,c}$ is the configured UE transmit power defined in [6] for subframe i of serving cell c and $PL_c$ is the downlink pathloss estimate calculated in the UE for serving cell c.
4. A preamble sequence is selected from the preamble sequence set using the preamble index.
5. A single preamble is transmitted using the selected preamble sequence with transmission power $P_{PRACH}$ on the indicated PRACH resource.
6. Detection of a PDCCH with the indicated RA-RNTI is attempted during a window controlled by higher layers (see [8], clause 5.1.4). If detected, the corresponding DL-SCH transport block is passed to higher layers. The higher layers parse the transport block and indicate the 20-bit uplink grant to the physical layer, which is processed according to section 6.2.

For a low-cost MTC UE which may not be mobile, e.g. the location of the UE is not changed, so the distance between the UE and eNB should be quite steady and environment around the UE may not vary significantly, and radio condition between the UE and eNB may not vary significantly. Then, the required power, e.g. REAMBLE_RECEIVED_TARGET_POWER, for a Preamble, to let eNB receives the Preamble successfully, may be quite similar in each Random Access procedure performed by the UE (since pathloss is taken into account by physical layer). However, when initiating a Random Access procedure, if the UE always starts using the power for a Preamble with an initial value configured by network, e.g. preambleInitialReceivedTargetPower+DELTA_PREAMBLE, the UE may need to perform power ramping several times to reach the required power. In other words, the UE has to transmit several unnecessary Preambles and monitor several unnecessary Random Access Response windows to receive a response in each Random Access procedure. Since the UE may enter RRC_CONNECTED only to transmit a small amount of data, power consumption caused by the Random Access procedure could be a big portion of total UE power consumption. Additionally, it will take a long time to complete a Random Access procedure thereby delaying data transmission. There may be a similar outcome when a UE wants to complete a Random Access procedure as soon as possible, e.g. the UE wants to enter RRC_CONNECTED due to emergency call (or high priority access) (as disclosed in 3GPP TS 36.331 V11.4.0), and there may be similar issues.

According to the various embodiments disclosed herein, a (stationary) device, such as a low-cost MTC UE, can use (or take into account) a power, used to transmit a last Preamble in a previous successfully completed Random Access procedure, as an initial power used to transmit a Preamble in a following Random Access procedure. In one embodiment, the device does not use the initial power configured by network to transmit the first Preamble of a Random Access procedure. In another embodiment, the power is preamble received target power or $P_{PRACH}$.

In another exemplary embodiment, a device can use (or take into account) a power, used to transmit a last Preamble in a previous successfully completed Random Access procedure, as an initial power used to transmit a Preamble in a following Random Access procedure when the device wants to complete a Random Access procedure as soon as possible, e.g., the UE wants to enter RRC_CONNECTED due to emergency call (or high priority access).

In the various embodiments, a device can choose one of at least two power ramping steps for preamble transmission in a Random Access procedure based on a cause triggering the Random Access procedure. More specifically, if the cause is emergent or has higher priority, the device chooses a larger power ramping step to calculate power used to transmit a Preamble. Alternatively, if the cause is not emergent or has lower priority, the device chooses a smaller power ramping step to calculate power used to transmit a Preamble. Since using larger power ramping step may result in larger preamble transmission power, the Random Access procedure may be successfully completed more easily and quickly. For example, the network would successfully receive the Preamble and/or Msg3 (as disclosed in 3GPP TS 36.321 V11.3.0) of the Random Access procedure more easily.

In one exemplary method for a device, the method includes: receiving a configuration of an initial power and a power ramping step for a preamble transmission; transmitting a first Preamble using a first power based on at least the initial power and the power ramping step, wherein the first Preamble is the last preamble transmission of a first Random Access procedure; determining whether the first Random Access procedure is successfully completed; transmitting a second Preamble using a second power based on at least the first power, wherein the second Preamble is the first preamble transmission of a second Random Access procedure.

In various methods, the second power may be the same as the first power. Alternatively, the second power may be calculated based on the first power. For example, the second power=the first power−n dB or the second power=the initial power+(the first power−the initial power)/n, wherein n is a constant. In another method, the first power may be calculated based on the addition on n power ramping steps, wherein n≥1. In yet another method, the first n Preambles, in which n is a fixed value or configured by network, or Preambles within a period of time, which may be controlled by a timer, in the second Random Access procedure are transmitted using the same power, such as the second power. In other methods, all Preambles in the second Random Access procedure are transmitted using the same power, such as the second power. In another method, a third Preamble may be transmitted, which is not the first preamble transmission of the second Random Access procedure, using a third power based on at least the second power and the power ramping step. In this method, the power ramping is applied to the third Preamble. Alternatively, a fourth Preamble may be transmitted, which is the first preamble transmission of a third Random Access procedure, using a fourth power based on at least the initial power if the second Random Access procedure was not successfully completed.

In yet another method, whether to use a power based on the initial power or the second power for the first preamble transmission of a Random Access procedure is controlled by network, e.g. an indication provided by network, or a timer or a counter configured by network.

In another method, a fourth Preamble may be transmitted, which is the first preamble transmission of a third Random Access procedure, using a fourth power based on at least the initial power if a timer expires. The timer is started or restarted based upon: (i) the first Random Access procedure is successfully completed; (ii) initiating the second Random Access procedure; (iii) transmitting the first Preamble; or (iv) transmitting the second Preamble.

Alternatively, a fourth Preamble may be transmitted, which is the first preamble transmission of a third Random Access procedure, using a fourth power based on at least the initial power if a counter reaches to a maximum number. The counter is used to count the number of initiated Random Access procedures.

In other methods, the first Random Access procedure and the second Random Access procedure are performed in the same cell. In yet another method, the location of the device is not changed between the first Random Access procedure and the second Random Access procedure. In yet another method, the configuration for preamble transmission is provided by a network and the configuration is not changed between the first Random Access procedure and the second Random Access procedure.

In the various methods disclosed herein, the device may be stationary or a (low-cost) MTC UE. In other methods, the initial power is a preambleInitialReceivedTargetPower. In other methods, the power ramping step is a powerRampingStep. In other methods, the power ramping step is not 0 (dB).

In other methods, a backoff parameter value for the second Random Access procedure is set to zero. Alternatively, the backoff parameter value for the second Random Access procedure is not set to zero. In other methods, the first power, the second power, the third power, or the fourth power is a preamble received target power, such as PREAMBLE_RECEIVED_TARGET_POWER. Alternatively, the first power, the second power, the third power, or the fourth power is $P_{PRACH}$.

In other methods, the device performs the second Random Access procedure due to emergency call. Alternatively, the device performs the second Random Access procedure due to high priority access. In other methods, the device is in an idle mode, such as RRC_IDLE (as disclosed in 3GPP TS 36.331 V11.4.0), when performing the second Random Access procedure.

In another exemplary method to complete a Random Access procedure, the method includes: storing a power which is used to transmit a last Preamble in a previous successfully completed Random Access procedure; and setting the power as an initial power.

In another exemplary method for a device, the method includes: having at least two different power ramping steps including a first power ramping step and a second power ramping step for preamble transmission, wherein the second power ramping step is larger than the first power ramping step; and choosing one of the at least two different power ramping steps to be used to calculate transmission power for a Preamble of a Random Access procedure, wherein the choice is based on at least a cause triggering the Random Access procedure.

In yet another exemplary method for a device, the method includes: using the first power ramping step to calculate transmission power for a Preamble of a Random Access procedure with lower priority; and using the second power ramping step to calculate transmission power for another Preamble of a Random Access procedure with higher priority, wherein the device has at least two different power ramping steps, wherein the first power ramping step and a second power ramping steps are used for preamble transmission, and wherein the second power ramping step is larger than the first power ramping step.

In various methods, if the cause is emergency call, the device chooses the second power ramping step to calculate the transmission power for the Preamble. If the cause is high priority access, the device chooses the second power ramping step to calculate the transmission power for the Preamble. If the cause is mobile terminating call (as disclosed in 3GPP TS 36.331 V11.4.0), the device chooses the first power ramping step to calculate the transmission power for the Preamble. If the cause is mobile terminating access (as disclosed in 3GPP TS 36.331 V11.4.0), the device chooses the first power ramping step to calculate the transmission power for the Preamble. If the cause is mobile originating call (as disclosed in 3GPP TS 36.331 V11.4.0), the device chooses the first power ramping step to calculate the transmission power for the Preamble. If the cause is mobile originating signaling (as disclosed in 3GPP TS 36.331 V11.4.0), the device chooses the first power ramping step to calculate the transmission power for the Preamble. If the cause is mobile originating CS fallback (as disclosed in 3GPP TS 36.331 V11.4.0), the device chooses the first power ramping step to calculate the transmission power for the Preamble. If the cause is mobile originating data (as disclosed in 3GPP TS 36.331 V11.4.0), the device chooses the first power ramping step to calculate the transmission power for the Preamble. If the cause is delay tolerant access (as disclosed in 3GPP TS 36.331 V11.4.0), the device chooses the first power ramping step to calculate the transmission power for the Preamble.

In yet another method, the first power ramping step is configured by a network, e.g. via system information. The second power ramping step is configured by a network, e.g. via system information or via a dedicated signaling.

In another method, the second power ramping step may be calculated based on the first power ramping step. For example, the second power ramping step=the first power ramping step+n dB. Alternatively, the second power ramping step may be a fixed value, e.g. 6 dB. Whether the second power ramping step is allowed to be used or not is controlled by network, e.g. an indication provided by network. In another method, the transmission power of each Preamble in the Random Access procedure can be calculated based on the same power ramping step. In another method, the transmission power of first n Preambles, wherein n is a fixed value or configured by the network, or certain Preambles within a period of time, such as controlled by a timer, in the Random Access procedure is calculated based on the same power ramping step.

In other methods, the power ramping step is powerRampingStep. In other methods, a backoff parameter value for the Random Access procedure is set to zero. Alternatively, the backoff parameter value for the Random Access procedure is not set to zero. In the various methods, the device is in idle mode, e.g. RRC_IDLE, when performing the Random Access procedure.

In these various methods, the device is stationary, a (low-cost) MTC UE, or a normal UE. In other methods, an initial power, e.g. preambleInitialReceivedTargetPower, is used to calculate the transmission power for the Preamble is not chosen based on the cause. In other methods, an initial power, e.g. preambleInitialReceivedTargetPower, is used to calculate the transmission power for the Preamble is the same (regardless the cause). In other methods, the device has (only) one (configured or applicable) initial power, e.g. preambleInitialReceivedTargetPower, which is used to calculate the transmission power for the Preamble.

Figure 5:
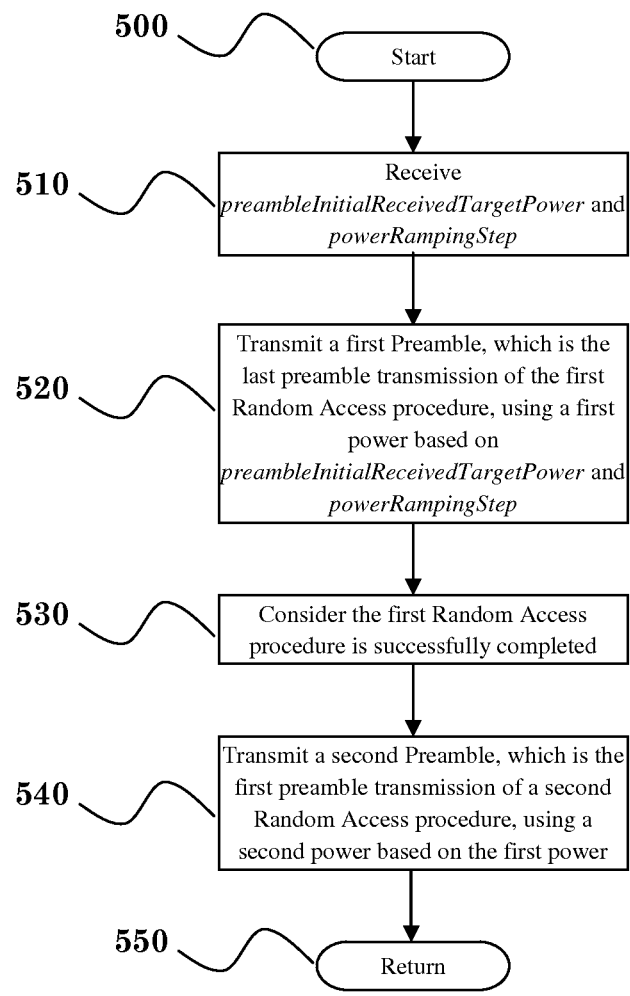
FIG. 5 is a block diagram according to one exemplary embodiment.

FIG. 5 illustrates one exemplary method including the following steps: starting the method at step 500, receive preambleInitialReceivedTargetPower and powerRampingStep at step 510; transmit a first Preamble, which the last preamble transmission of the first Random Access procedure, using a first power based on preambleInitialReceivedTargetPower and powerRampingStep at step 520; consider the first Random Access procedure is successfully completed at step 530; transmit a second Preamble, which is the first preamble transmission of a second Random Access procedure, using a second power based on the first power at step 540; and return at step 550.

Figure 6:
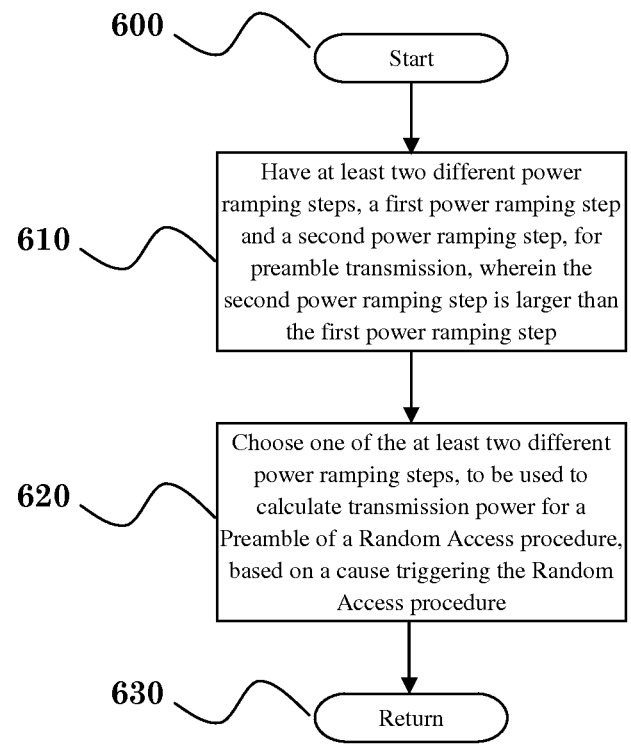
FIG. 6 is a block diagram according to one exemplary embodiment.

FIG. 6 illustrates one exemplary method including the following steps: starting the method at step 600; having at least two different power ramping steps, a first power ramping step and a second power ramping step for preamble transmission, wherein the second power ramping step is larger than the first power ramping step at step 610; choosing one of the at least two different power ramping steps to be used to calculate transmission power for a Preamble of a Random Access procedure based on a cause triggering the Random Access procedure at step 620; and return at step 630.

Referring back to FIGS. 3 and 4, the device 300 includes a program code 312 stored in memory 310. In one embodiment, the CPU 308 could execute program code 312 to execute one or more of the following: (i) receiving a configuration of an initial power and a power ramping step for a preamble transmission; (ii) transmitting a first Preamble using a first power based on at least the initial power and the power ramping step, wherein the first Preamble is the last preamble transmission of a first Random Access procedure; (iii) determining whether the first Random Access procedure is successfully completed; (iv) transmitting a second Preamble using a second power based on at least the first power, wherein the second Preamble is the first preamble transmission of a second Random Access procedure.

In another embodiment, the CPU 308 executes a program code 312 to execute one or more of the following: (i) storing a power which is used to transmit a last Preamble in a previous successfully completed Random Access procedure; and (ii) setting the power as an initial power.

In another embodiment, the CPU 308 executes a program code 312 to execute one or more of the following: (i) having at least two different power ramping steps including a first power ramping step and a second power ramping step for preamble transmission, wherein the second power ramping step is larger than the first power ramping step; and (ii) choosing one of the at least two different power ramping steps to be used to calculate transmission power for a Preamble of a Random Access procedure, wherein the choice is based on at least a cause triggering the Random Access procedure.

In another embodiment, a device has at least two different power ramping steps, wherein the first power ramping step and a second power ramping steps are used for preamble transmission, and wherein the second power ramping step is larger than the first power ramping step. The CPU 308 executes a program code 312 to execute one or more of the following: (i) using the first power ramping step to calculate transmission power for a Preamble of a Random Access procedure with lower priority; and (ii) using the second power ramping step to calculate transmission power for another Preamble of a Random Access procedure with higher priority.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a device to improve Random Access preamble transmission, the method comprising:
   receiving, at the device, at least two different power ramping steps including a first power ramping step and a second power ramping step as power ramping factors for preamble transmission,
   wherein the first power ramping step is configured by a network via system information and the second power ramping step is configured by the network via dedicated signaling, and
   wherein the second power ramping step is larger than the first power ramping step and wherein a power ramping step is a difference between preamble target received powers of two consecutive preamble transmissions;

choosing, by the device based on a cause triggering a Random Access procedure, one of the at least two different power ramping steps to be used to calculate transmission power for a Preamble of the Random Access procedure;

transmitting, by the device, the Preamble with the transmission power calculated by the first power ramping step when the Random Access procedure is triggered by a first cause; and transmitting, by the device, the Preamble with the transmission power calculated by the second power ramping step when the Random Access procedure is triggered by a second cause.

2. The method of claim 1, wherein the second cause is a high priority access.

3. The method of claim 1, the first cause is a mobile terminating call, mobile terminating access, mobile originating call, mobile originating signaling, mobile originating Circuit Switch (CS) fallback, mobile originating data, or delay tolerant access.

4. The method of claim 1, wherein the second power ramping step is a fixed value or calculated based on the first power ramping step.

5. The method of claim 1, wherein allowing the use of the second power ramping step is controlled by an indication provided by a network.

6. The method of claim 1, wherein when the Random Access procedure is triggered by the first cause, the device calculates the transmission power by an initial power and the first power ramping step, wherein a value of the initial power is given by a parameter preambleInitialReceivedTargetPower.

7. The method of claim 1, wherein the second cause has higher priority than the first cause.

8. The method of claim 1, wherein when the Random Access procedure is triggered by the second cause, the device calculates the transmission power by an initial power and the second power ramping step, wherein a value of the initial power is given by a parameter PreambleInitialReceivedTargetPower.

9. A communication device for improving Random Access preamble transmission in a wireless communication system, the communication device comprising:

a control circuit;

a processor installed in the control circuit;

a memory installed in the control circuit and operatively coupled to the processor;

wherein the processor is configured to execute a program code stored in the memory to improve Random Access preamble transmission in a wireless communication system by:

receiving, at the device, at least two different power ramping steps including a first power ramping step and a second power ramping step as power ramping factors for preamble transmission, wherein the first power ramping step is configured by a network via system information and the second power ramping step is configured by the network via dedicated signaling, and wherein the second power ramping step is larger than the first power ramping step and wherein a power ramping step is a difference between preamble target received powers of two consecutive preamble transmissions;

choosing, by the communication device based on a cause triggering a Random Access procedure, one of the at least two different power ramping steps to be used to calculate transmission power for a Preamble of the Random Access procedure;

transmitting, by the communication device, the Preamble with the transmission power calculated by the first power ramping step when the Random Access procedure is triggered by a first cause; and transmitting, by the communication device, the Preamble with the transmission power calculated by the second power ramping step when the Random Access procedure is triggered by a second cause.

10. The communication device of claim 9, wherein the second cause is a high priority access.

11. The communication device of claim 9, wherein the first cause is a mobile terminating call, mobile terminating access, mobile originating call, mobile originating signaling, mobile originating Circuit Switch (CS) fallback, mobile originating data, or delay tolerant access.

12. The communication device of claim 9, wherein the second power ramping step is a fixed value or calculated based on the first power ramping step.

13. The communication device of claim 9, wherein allowing the use of the second power ramping step is controlled by an indication provided by a network.

14. The communication device of claim 9, wherein when the Random Access procedure is triggered by the first cause, the device calculates the transmission power by an initial power and the first power ramping step, wherein a value of the initial power is given by a parameter preambleInitialReceivedTargetPower.

15. The communication device of claim 9, wherein the second cause has higher priority than the first cause.

16. The communication device of claim 9, wherein when the Random Access procedure is triggered by the second cause, the device calculates the transmission power by an initial power and the second power ramping step, wherein a value of the initial power is given by a parameter PreambleInitialReceivedTargetPower.

* * * * *